(12) United States Patent
Wenzler

(10) Patent No.: US 7,077,467 B2
(45) Date of Patent: Jul. 18, 2006

(54) CABLE RACEWAY

(75) Inventor: Alfred W. Wenzler, Winston-Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 377 days.

(21) Appl. No.: 10/640,704

(22) Filed: Aug. 14, 2003

(65) Prior Publication Data

US 2005/0034886 A1 Feb. 17, 2005

(51) Int. Cl.
- A47C 7/72 (2006.01)
- B64D 11/06 (2006.01)
- H02G 3/14 (2006.01)
- H05K 5/03 (2006.01)

(52) U.S. Cl. .............................. 297/188.08; 297/216.2; 297/217.3; 297/248; 297/452.18; 297/452.2; 174/48; 174/66; 244/118.6; 244/129.1

(58) Field of Classification Search ............ 297/188.08, 297/216.2, 217.3, 248, 452.18, 452.2; 174/48, 174/66; 220/241; 244/118.6, 122 R, 129.1
See application file for complete search history.

(56) References Cited

U.S. PATENT DOCUMENTS

| | | | |
|---|---|---|---|
| 4,454,692 A * | 6/1984 | Ault | 174/48 X |
| 4,965,972 A * | 10/1990 | Domigan et al. | 174/48 X |
| 5,546,717 A * | 8/1996 | Penczak et al. | 174/48 X |
| 6,323,421 B1 * | 11/2001 | Pawson et al. | 174/48 |
| 6,664,467 B1 * | 12/2003 | de la Borbolla | 174/48 |
| 6,749,266 B1 * | 6/2004 | Williamson | 297/452.2 |
| 6,835,891 B1 * | 12/2004 | Herzog et al. | 174/66 |
| 6,843,681 B1 * | 1/2005 | Sanner | 297/217.3 X |
| 6,863,344 B1 * | 3/2005 | Smallhorn | 297/217.3 |
| 6,903,265 B1 * | 6/2005 | VanderVelde et al. | 174/48 |
| 6,936,766 B1 * | 8/2005 | Galasso | 174/48 |
| 2003/0089515 A1 * | 5/2003 | Federspiel et al. | 174/48 |
| 2005/0062319 A1 * | 3/2005 | Hough | 297/188.08 |

* cited by examiner

*Primary Examiner*—Rodney B. White
(74) *Attorney, Agent, or Firm*—Adams Evans P.A.

(57) ABSTRACT

A cable raceway assembly includes an elongated raceway adapted for being mounted to a supporting structure. The raceway defines an open, upward-facing trough for receiving a cable and includes a mounting structure for attaching the raceway to the supporting structure. A fluid-resistant cover is attached to the raceway. The cover encloses at least a portion of the trough and forms a flowpath for directing fluid over and away from the trough.

10 Claims, 6 Drawing Sheets

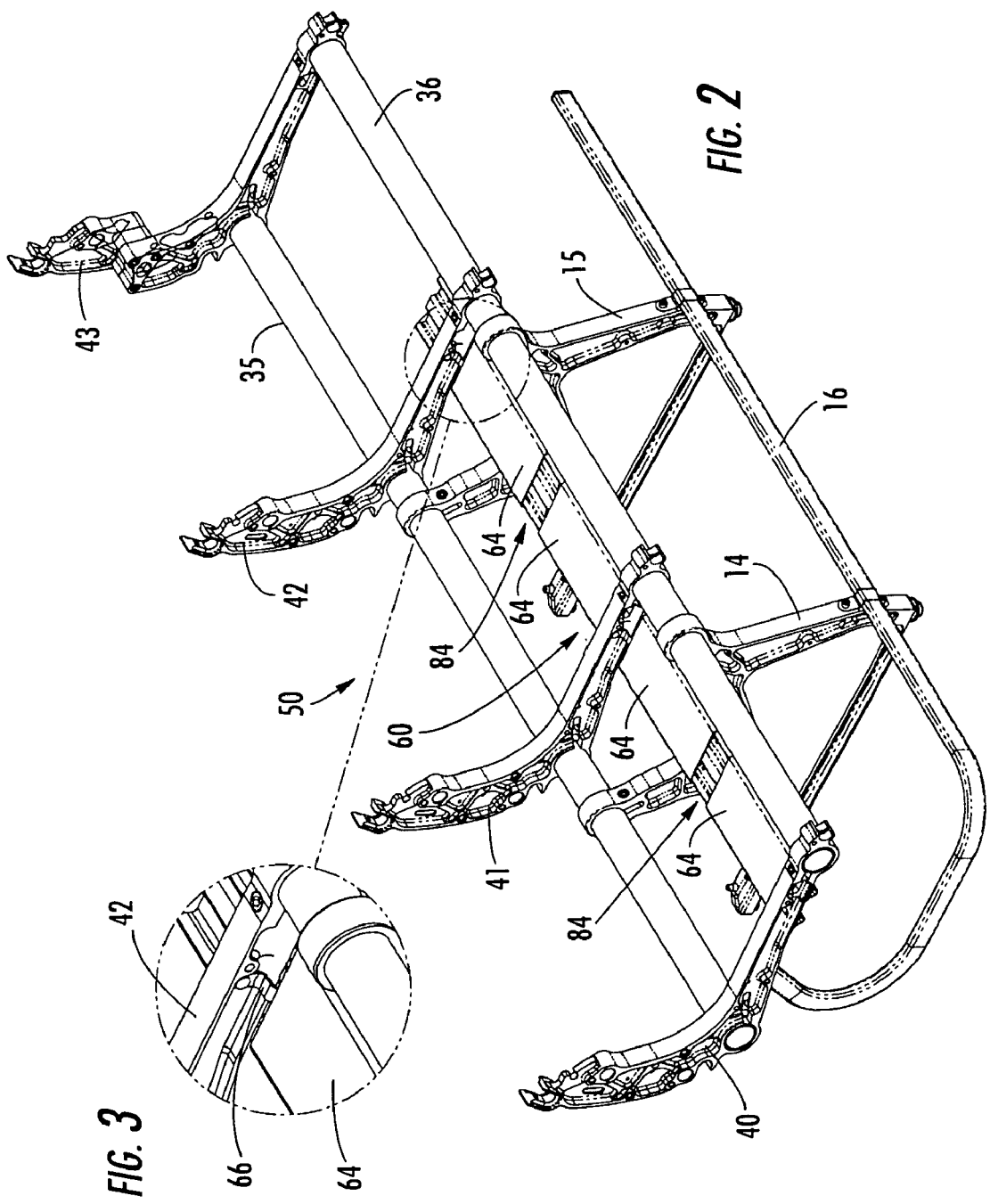

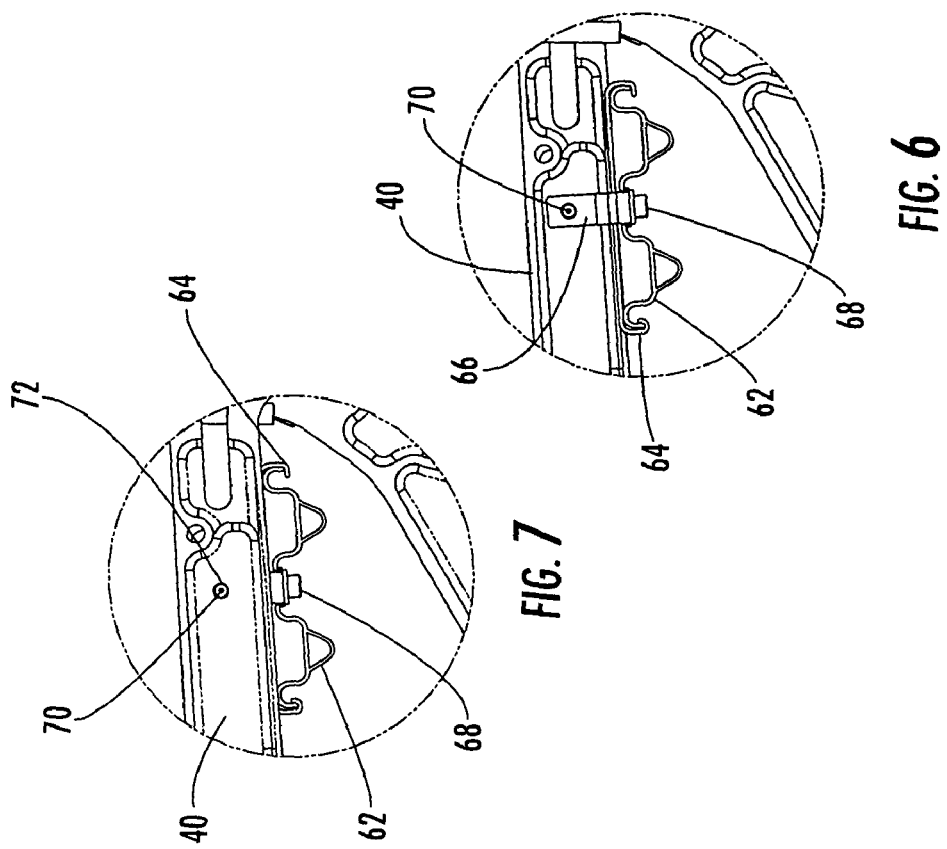
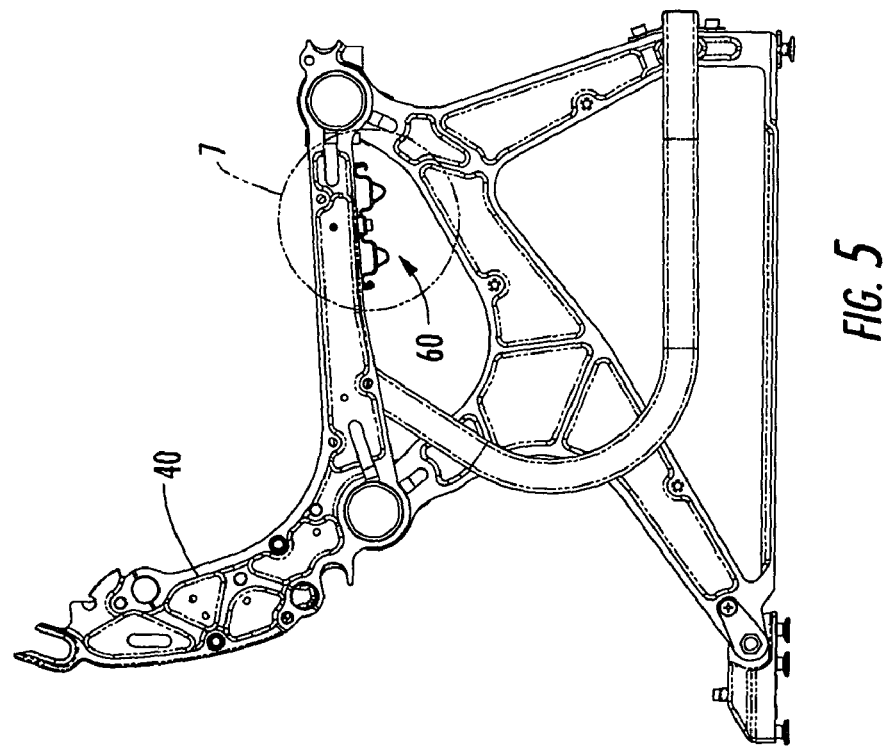

CABLE RACEWAY

BACKGROUND OF THE INVENTION

This invention relates generally to cable routing apparatus and more particularly to a cable raceway for an aircraft seat unit. Modern aircraft seating units include wiring for many purposes, for example lighting, in-flight entertainment (IFE) components, telecommunications connections, and the like. Typically the cables are provided in bundles which may be routed along the seat framing and tied to the frame. Wires attached in this manner are exposed to the external environment, making them susceptible to physical damage, foreign objects, spilled food or drink, etc., which can require costly maintenance or replacement. It is also expensive and time consuming to remove and replace cables attached in this manner. In some instances, the cables are laid in an open trough or raceway which is itself attached to the seat framing. While this eases installation and provides some protection to the cables either case, the wires are still exposed and susceptible to dropped objects or spilled food or drink.

Accordingly, it is an object of the invention to provide a cable raceway which provides physical protection for cables.

It is another object of the invention to provide a cable raceway which prevents liquids from reaching the cables therein.

BRIEF SUMMARY OF THE INVENTION

These and other objects are met by the present invention, which according to one embodiment provides a cable raceway assembly. The assembly includes an elongated raceway adapted for being mounted to a supporting structure. The raceway defines an open, upward-facing trough for receiving a cable, and a mounting structure for attaching the raceway to the supporting structure. A fluid-resistant cover is attached to the raceway, and encloses at least a portion of the trough and forms a flowpath for directing fluid over and away from the trough.

According to another embodiment of the present invention, the mounting structure comprises a plurality of mounting tabs attached to the raceway, Each of the mounting tabs includes an upstanding structure having a lower end attached to the raceway and an upper end which carries a laterally-extending mounting pin.

According to another embodiment of the present invention, the raceway includes a stiffening structure.

According to another embodiment of the present invention, the cover includes a pair of spaced-apart locking ribs for securing the cover to the raceway.

According to another embodiment of the present invention, the raceway includes a pair of spaced-apart side edges for engaging the locking ribs of the cover.

According to another embodiment of the present invention, said cover includes a central section and a pair of spaced-apart downwardly-extending flanges disposed at the outer edges thereof. The locking ribs are carried by the downwardly-extending flanges.

According to another embodiment of the present invention, a passenger seat frame assembly includes a ladder frame assembly including a plurality of leg modules and section assembly modules, the leg modules for being attached to fixed, spaced-apart attachment points on a supporting surface, and a plurality of beam elements for being carried by the leg modules and section assembly modules, and a cable raceway assembly. The cable raceway assembly includes a raceway adapted for being mounted to the section assembly modules. The raceway includes an elongated trough for receiving a cable, and a mounting element for attaching the raceway to the ladder frame assembly. A fluid-resistant cover is attached to the raceway. The cover encloses at least a portion of the trough and forms a flowpath for directing fluid over and away from the trough.

According to another embodiment of the present invention, a passenger seat includes a ladder frame assembly including a plurality of leg modules and section assembly modules, the leg modules for being attached to fixed, spaced-apart attachment points on a supporting surface, and a plurality of beam elements for being carried by the leg modules and section assembly modules, and a cable raceway assembly. The cable raceway assembly includes a raceway adapted for being mounted to the section assembly modules. The raceway includes an elongated trough for receiving a cable, and a mounting element for attaching the raceway to the ladder frame assembly. A fluid-resistant cover is attached to the raceway. The cover encloses at least a portion of the trough and forms a flowpath for directing fluid over and away from the trough. a seat bottom and a seat back are carried by the ladder frame assembly.

BRIEF DESCRIPTION OF THE DRAWINGS

The subject matter that is regarded as the invention may be best understood by reference to the following description taken in conjunction with the accompanying drawing figures in which:

FIG. 2 is a perspective view of a seat frame assembly including a cable raceway constructed in accordance with the present invention;

FIG. 3 is an enlarged view of a portion of the seat frame shown in FIG. 2;

FIG. 5 is a side view of a seat frame including a cable raceway;

FIG. 6 is an enlarged view of a portion of the seat frame shown in FIG. 5;

FIG. 7 is reversed view of in FIG. 6;

DETAILED DESCRIPTION OF THE INVENTION

Figure 1:
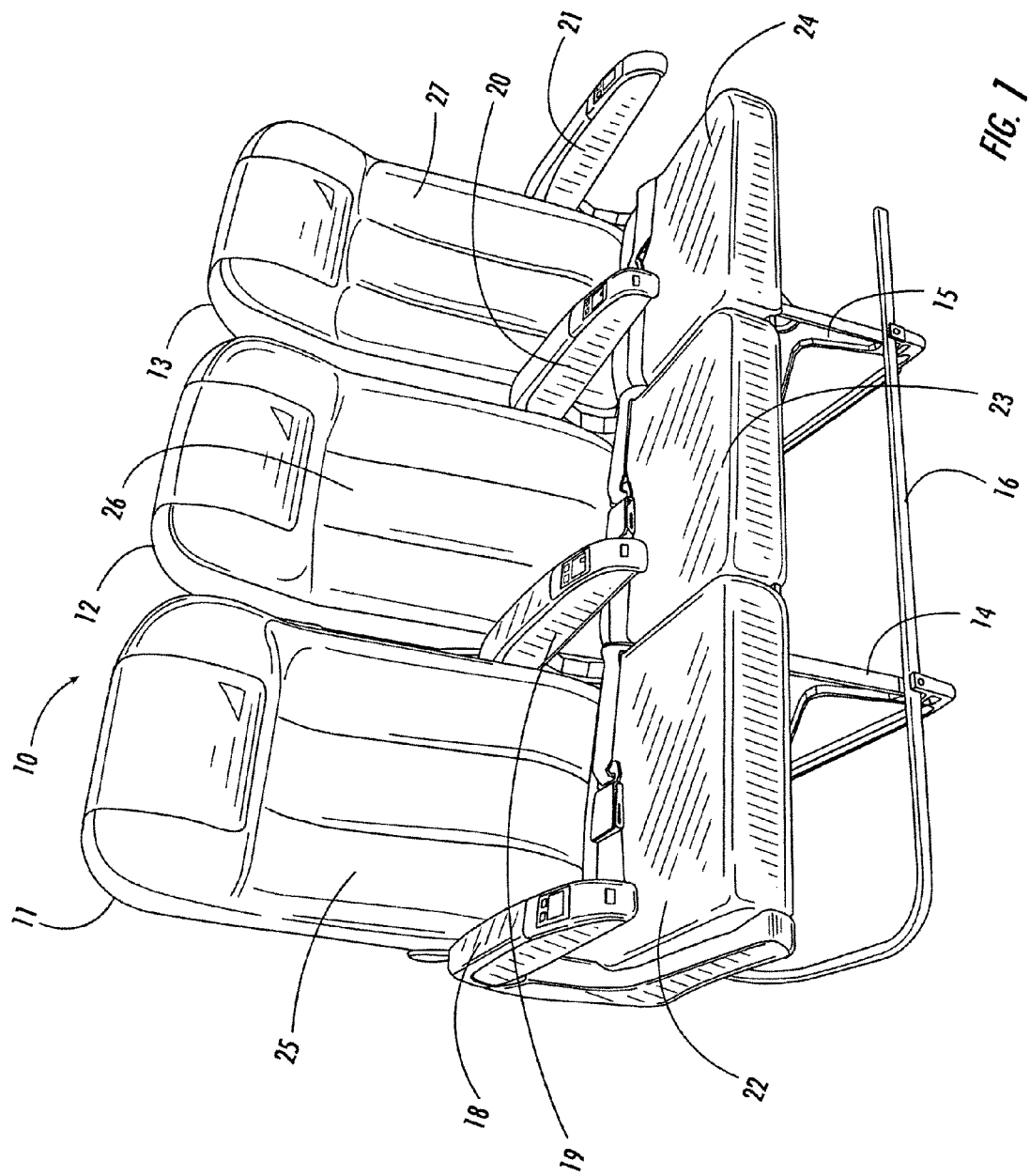
FIG. 1 is a perspective view of a seat set constructed in accordance with the present invention.

Referring to the drawings wherein identical reference numerals denote the same elements throughout the various views, an aircraft passenger seat set according to the present invention is illustrated in FIG. 1 and shown generally at reference numeral 10. In the particular embodiment shown in FIG. 1, the seat set 10 is composed of three adjacent seats, an aisle seat 11, a center seat 12, and a window seat 13. The seat set 10 is supported on a pair of leg modules 14 and 15, and includes a baggage guard rail 16. The seats 11, 12, and 13 are provided with arm rests 18, 19, 20, and 21. The seats 11, 12, and 13 include seat bottoms 22, 23, and 24, respectively, and seat backs 25, 26, and 27, respectively.

The internal structure of the seat set 10 is shown in FIG. 2, with various parts eliminated for clarity. As is shown, the seat set 10 is supported on and thus shares the two leg modules 14 and 15. The leg modules 14 and 15 carry a pair of laterally-extending beam elements 35 and 36 on which are mounted four section assembly modules 40, 41, 42, and 43. The leg modules 14, 15; beam elements 35 and 36, and the section assembly modules 40, 41, 42, and 43 tie together the components in a manner necessary to from a seat set 10 having significant structural integrity within passenger comfort, fuselage size and government regulation requirements. The underlying structure defined by leg modules 14, 15; beam elements 35 and 36, and the section assembly modules 40, 41, 42, and 43 is referred to as a "ladder frame assembly" and is indicated at reference numeral 50.

Of course, the seats according to the present invention can be integrated together to form seat sets of different lengths, spacings, and numbers of seats. Whether one, two, three or more seats, each seat set 10 will include at least two leg modules, such as leg modules 14 and 15. Thus, when a seat is referred to as having a pair or a plurality of leg modules, it is understood that at least two leg modules are required, but that the two leg modules may not necessarily be on opposing sides of any particular seat. For example, in FIG. 1, three seats 11,12, and 13 are each supported on two leg modules 14,15. Thus, seat 11 is supported on two leg modules 14,15, just as are seats 12 and 13, and whether the seat set 10 is considered a "seat" or the three seats 11,12 and 13 are considered "seats", in either case they are supported by a plurality of legs.

Referring again to FIG. 2, the seat set incorporates a cable raceway assembly 60, which includes a laterally-extending raceway 62 and one or more covers 64, described in more detail below. The raceway assembly 60 is mounted to the ladder frame assembly 50 in a location out of the way of the seats 11, 12, and 13 and high enough to avoid damage from articles of carry-on luggage or the like. In the illustrated example, the raceway 62 is mounted against the underside of the section assembly modules 40, 41, and 42. The mounting may be done in any convenient manner.

FIGS. 3–7 show an example of a suitable mounting arrangement in more detail. The raceway 62 includes several mounting tabs 66 that extend upwardly from the raceway 62. The mounting tabs 66 are generally L-shaped structures which are attached to the raceway 62 in a known manner, such as spot welding, or with fasteners 68 as shown in FIGS. 6 and 7. The mounting tabs 66 may include one or more bends so that they may conform to the contours of the section assembly modules, as shown in FIG. 3. The mounting tabs 66 each carry a laterally-extending mounting pin 70 which is received in a complementary mounting hole 72 in the corresponding section assembly module (e.g., item 40 in FIGS. 6 and 7). The raceway 62 is attached to the section assembly modules by placing it in position underneath the section assembly modules. The mounting tabs 66 are then put into position so the mounting pins 70 engage the mounting holes 72 in the section assembly modules. Finally, the mounting tabs 66 are attached to the raceway 62, for example with fasteners 68 (see FIGS. 6 and 7). Alternatively, the mounting tabs 66 may be attached to the raceway 62 before the raceway 62 is installed. In this case, the raceway 62 is installed by placing it in position under the section assembly modules and then shifting it laterally so that the mounting pins 70 engage the mounting holes 72 in the section assembly modules. FIGS. 5, 6, and 7 illustrate this arrangement in more detail. In particular, FIG. 7 shows how the mounting pin 70 engages the mounting hole 72. FIG. 6 is a view from the opposite side of the section assembly module 40 relative to FIG. 7 and shows the relationship of the raceway 62, the mounting tab 66, and the mounting pin 70.

Figure 4:
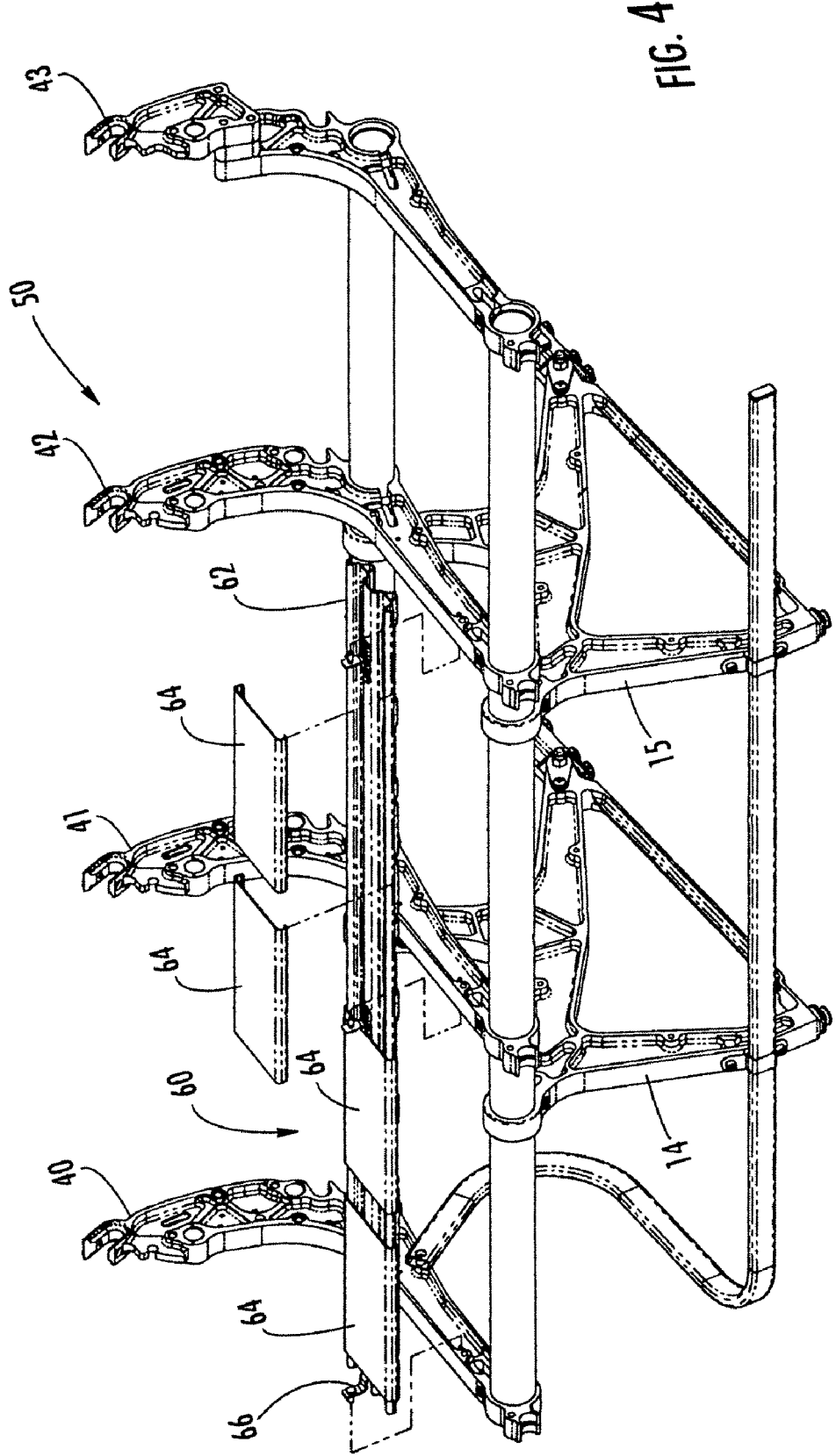
FIG. 4 is an exploded perspective view of a seat frame and a cable raceway.

As shown in FIG. 4, one or more of the mounting tabs 66 may be reversed relative to the other mounting tabs 66. The mounting pin 70 carried by this mounting tab 66 thus extends opposite to the other mounting pins 70. This arrangement of the mounting tabs 66 ensures that the raceway 62 will remain attached to the ladder frame assembly 50 and prevents it from shifting laterally relative to the ladder frame assembly 50 without the use of additional fasteners.

Figure 8:
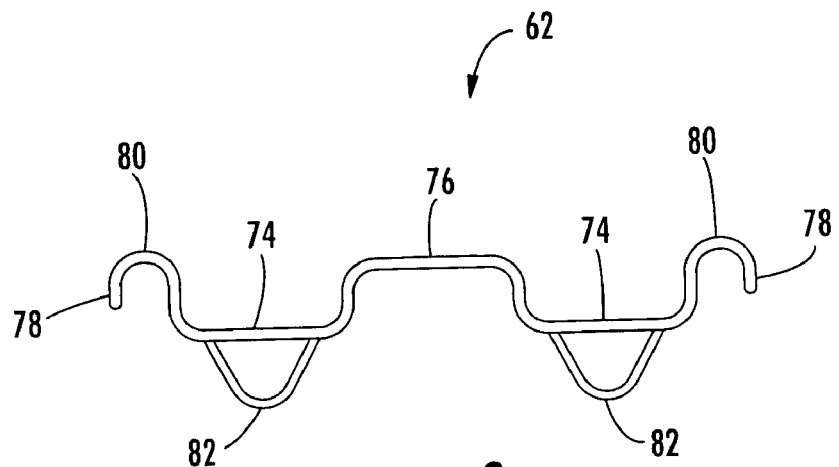
FIG. 8 is an end view of a cable raceway.
Figure 9:
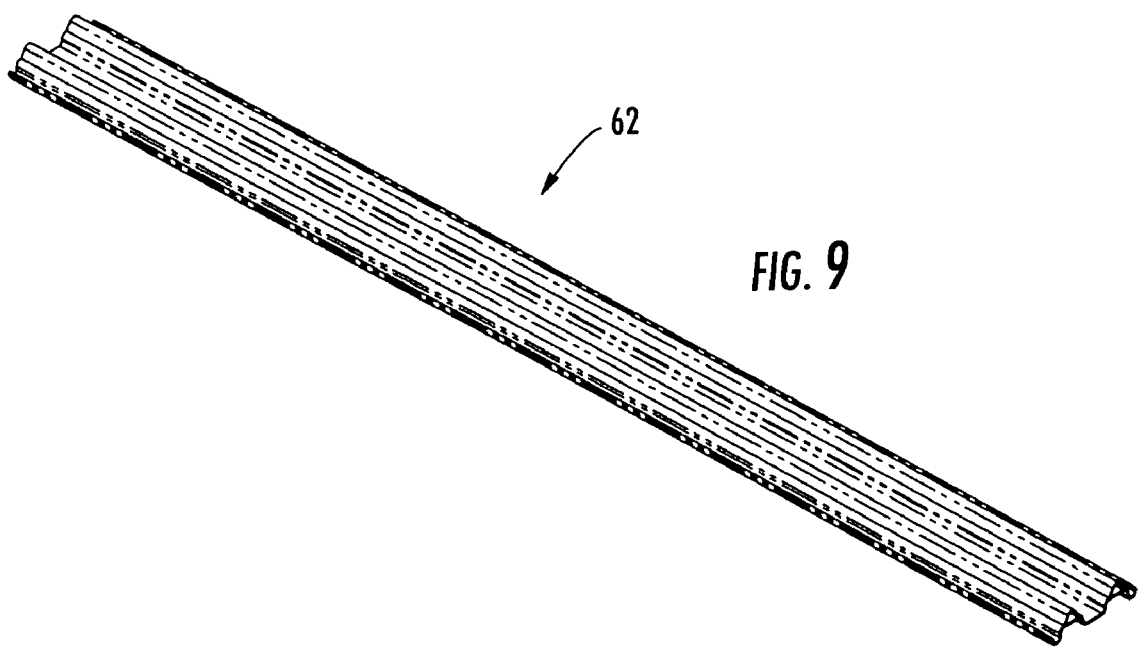
FIG. 9 is perspective view a cable raceway as seen from below.

FIGS. 8 and 9 illustrate the raceway 62 in more detail. The raceway 62 may be made of any suitable material such as plastic or sheet metal. The raceway 62 is formed into a shape which defines one or more laterally-extending troughs 74. In the illustrated example there is a pair of troughs 74 disposed on opposite sides of a raised central portion 76. The troughs 74 accept wires or cables (not shown) that are to be run under the passenger seats. The raceway 62 also includes a pair of side rails 78 which engage a cover, described below. Each of the side rails 78 is positioned in spaced-apart relationship to the adjacent trough 74 by an arcuate cross-section side flange 80. The central portion 76, troughs 74, side flanges 80 and side rails 78 may all be formed as part of a single unitary component. The raceway 62 may also include on or more stiffeners 82 to prevent the raceway 62 from sagging or deflecting when installed. The illustrated stiffeners 82 have an arcuate cross-section, but simple flanges could also be used. The stiffeners 82 may be formed integrally with the raceway 62 or made separately and attached to the raceway 62, for example by welding.

Figure 10:
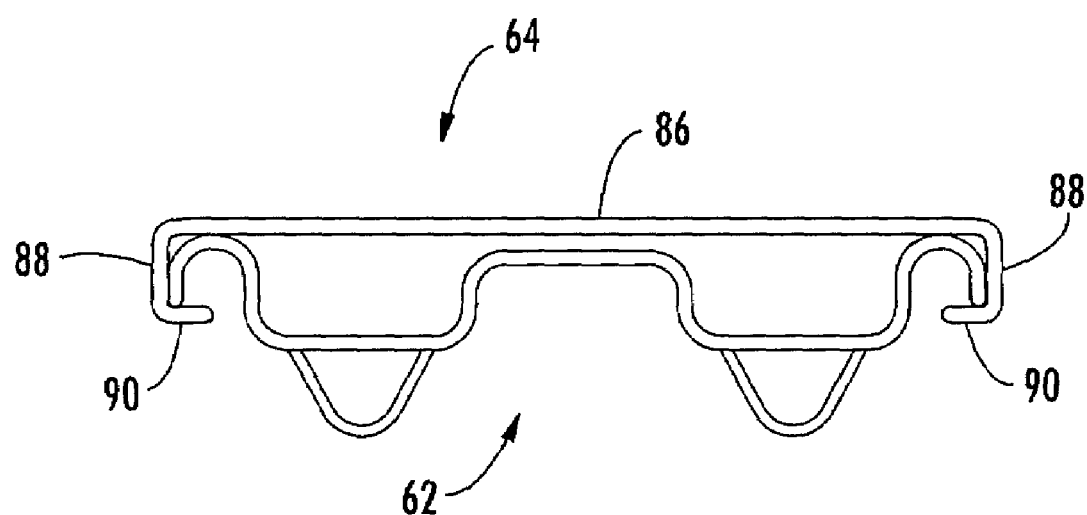
FIG. 10 is an end view of a cable raceway with a cover attached thereto.

The raceway assembly 60 includes one or more covers 64. Referring to FIG. 10, the covers 64 are generally flat, laterally extending structures which span the raceway 62. The lengths of the covers 64 are selected so that they will fit between the spaced-apart section assembly modules. The lengths of the covers 64 may be selected to leave gaps 84 between adjacent ones of the covers 64 if needed, for example in locations where cables must pass out of the raceway up into the seat unit 10 (see FIG. 2). The covers 64 may be made of any suitable liquid-resistant material such as sheet metal or plastic. The cover 64 includes a flat central portion 86, a pair of downwardly-extending flanges 88, and a pair of locking ribs 90 which extend inward from the lower ends of the flanges 88. The locking ribs 90 extend around and under the side rails 78 of the raceway 62 in the installed position.

In use, the raceway 62 is mounted to the ladder frame assembly 50 as described above. The position of the raceway 62 and its overall length may be varied to suit a particular application. Next, the required cables or wire bundles (not shown) are routed and laid into the troughs 74. Then, the covers 64 are attached to the raceway 62. This may be done by spreading the locking ribs 90 apart and pressing the cover 64 down over the raceway 62 until the locking ribs 90 snap into place around the side rails 78 of the raceway 62. Alternatively, the covers 64 may be installed before the raceway 62 is attached to the ladder frame assembly 50 and then the cables may be threaded into the troughs 74. Gaps 84 may be left between the covers 64 which allow individual cables or sections of bundles to pass upward where needed. After the covers 64 are installed, the seats 11,12, and 13 may then been mounted to the ladder frame assembly 50 in a known manner. The cables are then protected from physical damage or foreign objects that may be dropped onto them by the raceway 62 and the covers 64. Furthermore, any food or liquids that might be spilled by a passenger will be caught by the cover 64. The cover 64 with its downwardly-extending flanges 88 forms a flow path which directs any fluid to the sides of and off the raceway 62 safely away from the cables in the troughs 74.

The foregoing has described a cable raceway assembly including an elongated raceway adapted for being mounted to a supporting structure, and a fluid-resistant cover attached to the raceway. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation--the invention being defined by the appended claims.

What is claimed is:

1. A passenger seat frame assembly, comprising:
   (a) a ladder frame assembly including a plurality of leg modules and section assembly modules, said leg modules for being attached to fixed, spaced-apart attachment points on a supporting surface;
   (b) a plurality of beam elements for being carried by said leg modules and section assembly modules; and
   (c) a cable raceway assembly, comprising:
      (i) a raceway mounted to said ladder frame assembly, said raceway including an elongated trough for receiving a cable; and
      (ii) a fluid-resistant cover disposed above said raceway, said cover having a central section bounded by outer edges, a pair of spaced-apart downwardly-extending flanges disposed at the outer edges, and a pair of spaced-apart locking ribs for securing said cover to said raceway, said cover enclosing at least a portion of said trough and forming a flowpath for directing fluid over and away from said trough.

2. The seat frame assembly of claim 1, wherein said raceway includes a plurality of mounting tabs attached thereto, each of said mounting tabs comprising an upstanding structure having a lower end attached to said raceway and an upper end which carries a laterally-extending mounting pin, said pins being received in mounting holes formed in said section assembly modules.

3. The seat frame assembly of claim 1, wherein said raceway includes a stiffening structure.

4. The seat frame assembly of claim 1, wherein said raceway includes a pair of spaced-apart side edges for engaging said locking ribs.

5. The seat frame assembly of claim 1, wherein said locking ribs are carried by said downwardly-extending flanges.

6. A passenger seat, comprising:
   (a) a seat frame assembly, comprising:
      (i) a ladder frame assembly including a plurality of leg modules and section assembly modules, said leg modules for being attached to fixed, spaced-apart attachment points on a supporting surface;
      (ii) a plurality of beam elements for being carried by said leg modules;
   (b) a cable raceway assembly, comprising:
      (i) a raceway mounted to said ladder frame assembly, said raceway including an elongated trough for receiving a cable; and
      (ii) a fluid-resistant cover disposed above said raceway, said cover having a central section bounded by outer edges, a pair of spaced-apart downwardly-extending flanges disposed at the outer edges, and a pair of spaced-apart locking ribs for securing said cover to said raceway, said cover enclosing at least a portion of said trough and forming a flowpath for directing fluid over and away from said trough; and
   (c) a seat bottom and a seat back carried by said ladder frame assembly.

7. The passenger seat of claim 6, wherein said raceway includes a plurality of mounting tabs attached thereto, each of said mounting tabs comprising an upstanding structure having a lower end attached to said raceway and an upper end which carries a laterally-extending mounting pin, said pins being received in mounting holes formed in said section assembly modules.

8. The passenger seat of claim 6, wherein said raceway includes a stiffening structure.

9. The passenger seat of claim 6, wherein said raceway includes a pair of spaced-apart side edges for engaging said locking ribs.

10. The passenger seat of claim 6, wherein said locking ribs are carried by said downwardly-extending flanges.

* * * * *